_United States Patent Office_

3,632,812
Patented Jan. 4, 1972

3,632,812
PROCESS FOR PREPARING ORGANIC THIOFORM-
AMIDES AND ORGANIC DITHIOCARBAMATES
Ludwig Maier, Tiergartenstrasse 17, Kilchberg,
Zurich, Switzerland
No Drawing. Filed Feb. 20, 1969, Ser. No. 801,208
Int. Cl. C07c 155/08
U.S. Cl. 260—293.85  9 Claims

ABSTRACT OF THE DISCLOSURE

Process for preparing organic thioformamides of the formula $R^1R^2NC(S)H$ and organic dithiocarbamates of the formula $R^1R^2NC(S)SH \cdot HNR^1R^2$ by either reacting formaldehyde and an amine or the condensation product thereof with sulfur at elevated temperatures in aqueous alcohol having 1 to 4 carbon atoms.

---

The present invention relates to a process for preparing organic thioformamides of the general formula $$R^1(R^2)NC(S)H$$

and organic dithiocarbamates of the general formula $$R^1(R^2)NC(S)SH \cdot HN(R^1)R^2$$

in which $R^1$ and $R^2$ are identical or different, possibly substituted, alkyl, cycloalkyl, aralkyl groups, heterocyclic groups, or when taken together with their nitrogen atom a heterocyclic group, which groups in particular can have additional formamide groups, thioformamide groups or dithiocarbamate groups attached via their nitrogen atom, and $R^2$ can also be a hydrogen atom. Normally each R group will have not more than 24 carbon atoms and for some uses not more than 8 carbon atoms. Organic thioformamides have been prepared previously from formamides and $P_2S_5$ and organic dithiocarbamates from amines and $CS_2$.

It has now been found that these compounds are obtained when either formaldehyde and an amine or the general formula $$R^3(R^4)NH$$

in which $R^3$ and $R^4$ are identical or different, possibly substituted, alkyl, cycloalkyl, aralkyl groups, heterocyclic groups, or when taken together with their nitrogen atom a heterocyclic group, which groups can have additional amino groups attached via their nitrogen atom, and $R^4$ can also be a hydrogen atom, and which amine possesses a dissociation constant $pK_a \geqslant 8$, or a condensation product formed from these components of the general formula $$R^3(R^4)NCH_2OH \text{ or } R^3N=CH_2$$

in which $R^3$ and $R^4$ have the same significance as above, is heated with sulfur in an aqueous alcohol containing 1 to 4 carbon atoms, possibly in the presence of a tertiary base.

The formation of the organic thioformamides occur according to the equation (a) $R^3(R^4)NH + CH_2O + S \rightarrow R^1(R^2)NC(S)H + H_2O$ Part of the organic thioformamides react immediately with excess sulfur, which is present and with amine which has not yet reacted, to form the corresponding dithiocarbamates according to the equation (b) $R^1(R^2)NC(S)H + HN(R^3)R^4 + S$
$\rightarrow R^1(R^2)NC(S)SH \cdot HN(R^3)R^4$ so that, as a rule, both products are formed simultaneously.

The amine suitable for the process of invention should have a dissociation constant of $pK_a \geqslant 8$ determined in an aqueous solution at 25° C. Aniline ($pK_a$ 4.58), for example, is not suitable. The more basic amine the better the reaction proceeds. Therefore, the amines possess preferably a dissociation constant $pK_a \geqslant 10$. All amines are suitable which can form with formaldehyde a condensation product (methanolamine or Schiff base). Examples of suitable amines are aliphatic amines such as methylamine, dimethylamine, ethylamine, diethylamine, di-2-methoxyethylamine, di-2-dimethylaminoethylamine, n-propylamine, di-3-carbethoxypropylamine, iso-propylamine, di-iso-propylamine, di-n-propylamine, 6-dimethylaminohexylamine and higher aliphatic amines such as octylamine, 8-phenoxyoctylamine, dioctylamine, di-8-chlorooctylamine, dilaurylamine and distearylamine; cycloaliphatic amines such as cyclopentylamine, dicyclopentylamine, cyclohexylamine, dicyclohexylamine, cycloheptylamine, cycloundecylamine and dicyclododecylamine; araliphatic amines such as dibenzylamine, 2-p-chlorophenylethylamine and di-3-phenylpropylamine; and also, heterocyclic amines such as pyrrolidine, piperidine and morpholine.

It is clear that two organic groups on the same nitrogen atom can also be different as in, for example, the compounds N-methyl-butylamine, N-ethyl-cyclohexylamine, N-propyl-benzylamine and N-ethyl-3-phenylpropylamine. Also divalent and multivalent amines can be used. Examples are ethylene diamine, diethylene triamine, butylene diamine, 1,3-bis-methylamino-ethane, 1,2,3-trismethylamino-propane, bis-ethylaminoethyl-amine and piperazine.

When using divalent or multivalent amines there can be obtained compounds where $R^1$ and $R^2$ in the formula set forth above contain as substituents either thioformamide groups, formamide groups or dithiocarbamate groups. These compounds correspond in the simplest case to the formulae $$H(S)CN(R^2)R^1(R^2)NC(S)H$$
$$\cdot H(S)CN(R^2)R^1(R^2)NC(O)H$$

and $$R^1(R^2)NH \cdot HS(S)CN(R^2)R^1(R^2)NC(S)SH \cdot HN(R^2)R^1$$

The reaction is not feasible in an anhydrous solvent, such as, for example, anhydrous alcohol of the cited species and paraformaldehyde. Water alone also is not suited. A mixture of an alcohol and water containing about 10 to 40% per weight of water is expediently used. The amine and the formaldehyde are advantageously reacted in equimolar amounts which are necessary to form the intermediate condensation product.

It has been found that the overall yield of the end-products obtainable according to the Equations a and b is increased when excess sulfur is employed. At least a four-fold excess of sulfur is preferably used whereby in some instances about the same quantities of thioformamides and dithiocarbamates can be obtained.

When practising the invention, at first the condensation product can be prepared from the amine and formaldehyde at room temperature or lower temperatures, and then the condensation product can be reacted with sulfur at higher temperature such as, for example, the boiling point of the solvent mixture. However, all three reactants can simply be heated in the alcohol-water mixture. For the separation and isolation of the two end products, it is advantageous that the thioformamides in general are extractable from the aqueous solution with solvents such as, for example, ethers, whereas the dithiocarbamates remain in the aqueous solution.

It has been found that with morpholine the reaction of invention can only be performed in the presence of a tertiary base. About 1 to 20% of pyridine, based on the morpholine, are expediently employed.

The dithiocarbamates in form of metal salts, e.g. zinc salts, are valuable compounds for destroying weeds. The thioformamides are reactive intermediates, because they can be reacted in similar manner to the formamides.

EXAMPLE 1

To 56.2 g. aqueous solution of dimethylamine (40%, 22.5 g. (0.5 mole) of dimethylamine) in 100 ml. of ethyl alcohol are added with cooling with ice 40.5 g. of aqueous solution of formaldehyde (37%, 15 g. (0.5 mole) of formaldehyde). The mixture is warmed up to room temperature and after addition of 48 g. (1.5 moles) of sulfur, the mixture is refluxed with stirring. After about 3 hours two phases are apparent and upon further heating for about 2 hours the solution becomes homogeneous, and some $H_2S$ is evolved. Excess sulfur is filtered off, the filtrate freed of the alcohol and extracted with ether. The ether is distilled off and the residue fractionally distilled. After a small forerun containing formamide, there are obtained 20.5 g. (46%) of thioformamide; B.P. 95–101° C./10 mm., $n_D^{20}$ 1,5718. (The yields each time are based on the amine employed.)

$C_3H_7NS$ (89.15). Calc'd (percent): C, 40.41; H, 7.93; N, 15.71; S, 36.00. Found (percent): C, 41.66; H, 8.52; N, 15.29; S, 35.17.

The thioformamide yields an adduct with methyl iodide; M.P. 122–124° C.

Upon evaporation of the aqueous solution there are obtained 13 g. (31.2%) of crude dimethylammonium dimethyldithiocarbamate $$((CH_3)_2NC(S)S^-\cdot {}^+H_2N(CH_3)_2)$$

obtainable as white crystals after stirring with some ethyl alcohol. Yield 9.5 g. (23%); M.P. 129–131° C.

$C_5H_{14}N_2S_2$ (166.31). Calc'd (percent): C, 36.09; H, 8.48; N, 16.86; S, 38.60. Found (percent): C, 35.84; H, 8.70; N, 16.73; S, 38.32.

5 g. of the salt together with 4.3 g. of methyl iodide in 50 ml. of methyl alcohol are stirred at 20° C. for 1 hour. Then, the mixture is poured onto water and the solid filtered off and recrystallized in a mixture of methyl alcohol and water. Yield 3.5 g. (86.5%) of $(CH_3)_2NC(S)SCH_3$; M.P. 46–47° C.

The runs described in the table below are carried out in the same manner as described above using varied stoichiometric proportions:

| Ratio $CH_2O$:$(CH_3)_2NH$:S | Reaction time in hours | Yield in percent | |
|---|---|---|---|
| | | $(CH_3)_2NC(S)H$ | $(CH_3)NC(S)S^-\cdot {}^+H_2N(CH_3)_2$ |
| 1:1:1 | 5 | 19.1 | 2.4 |
| 1.25:1:1 | 4 | 19.1 | 1.9 |
| 1:1:2 | 3 | 33.3 | 21.8 |
| 1:1:2.5 | 6 | 41.0 | 26.5 |
| 1:1:3 | 5 | 46.0 | 23.0 |
| 1:1:3.5 | 10 | 37 | 24 |
| 1:1:4 | 8 | 40.4 | 38.6 |

It is apparent that the overall yield of compounds is 79% using a ratio of 1:1:4 versus 21.5% using a ratio of 1:1:1.

EXAMPLE 2

15 g. (0.5 mole) of formaldehyde (aqueous solution), 36.6 g. (0.5 mole) of diethylamine and 48 g. (1.5 moles) of sulfur are added to 35 ml. of water and 100 ml. of ethyl alcohol and reacted as in Example 1. From the ether extract are obtained 12 g. (20.4%) of thioformamide [$(C_2H_5)_2NC(S)H$]; B.P. 105–107° C./9 mm.

$C_5H_{11}NS$ (117.2). Calc'd (percent): C, 51.22; H, 9.44; N, 11.96; S, 27.38. Found (percent): C, 51.04; H, 9.69; N, 11.83; S, 26.91.

From the aqueous solution after evaporation and extraction with acetone there are obtained 5 g. (9%) of diethylammonium diethyldithiocarbamate; M.P. 81–82° C.

$C_9H_{22}N_2S_2$ (222.43). Calc'd (percent): C, 48.61; H, 9.93; N, 12.62; S, 28.88. Found (percent): C, 48.34; H, 10.21; N, 12.02; S, 28.56.

2 g. of this salt with 1.3 g. of methyl iodide in 20 ml. of methyl alcohol yield 1 g. of thioester $$[(C_2H_5)_2NC(S)SCH_3]$$

$n_D^{20}$ 1.5810.

When the same reaction is carried out in 100 ml. of ethyl alcohol without additional water, so that only the water of the solution of formaldehyde is present, there are obtained 6 g. (10.2%) of thioformamide, 10 g. (18%) of dithiocarbamate and 4.1 g. of a white crystalline solid of M.P. 132–135° C. (decomposition, turns yellow at 125° C. and sinters, turns brown and begins to melt with the formation of bubbles at the same time at 136° C.). The compound is weakly acidic having in aqueous solution a pH of 6.1 (0.038 molar solution). Combustion analysis and the $^1H$–NMR spectrum are consistent with the following structure:

$$(C_2H_5)_2NSOH\cdot\tfrac{1}{2}H_2O$$

or

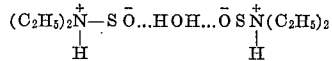

Thus it constitutes the first stable derivative of a N-sulfoxylic acid.

$C_4H_{11}NOS\cdot\tfrac{1}{2}H_2O$ (130.21). Calc'd (percent): C, 36.89; H, 9.28; N, 10.75; S, 24.62. Found (percent): C, 36.62; H, 9.24; N, 10.24; S, 24.36, 36.64, 9.46, 10.26, 25.14.

EXAMPLE 3

15 g. (0.5 mole) of formaldehyde (aqueous solution), 64.6 g. (0.5 mole) of di-n-butylamine and 48 g. (1.5 moles) of sulfur are reacted as in Example 1, refluxed for 12 hours and worked up as in Example 1. From the ether extract are obtained 40 g. (46.3%) of a liquid; B.P. 70–75° C./4 mm., which according to the $^1H$–NMR spectroscopy consist of 53.2% of $$(N-C_4H_9)_2NC(S)S^-\cdot {}^+H_2N(C_4H_{9-n})_2$$

and 46.8% (n-$C_4H_9$)$_2NH$.

Analysis of the mixture.—Calc'd (percent): C, 64.38; H, 12.32; N, 9.00; S, 14.3. Found (percent): C, 64.52; H, 12.51; N, 8.97; S, 13.8.

The mixture partially crystallized on standing. The crystals filtered off are dibutyl ammonium dibutyldithiocarbamate, M.P. 49–50° C. Upon evaporation of the aqueous phase 6 g. of a yellow highly viscous gum is obtained, which would not crystallize.

EXAMPLE 4

15 g. (0.5 mole) of formaldehyde (aqueous solution), 35.5 g. (0.5 mole) of pyrrolidine and 48 g. (1.5 moles) of sulfur are added to 35 ml. of water and 100 ml. of ethyl alcohol, refluxed for 4 hours and worked up as in Example 1. From the ether extract are obtained 9 g. (15.4%) thioformamide [$C_4H_8NC(S)H$]; B.P. 100–110° C./1 mm., M.P. 32–33° C.

$C_5H_9NS$ (115.19). Calc'd (percent): C, 52.02; H, 7.88; N, 12.18; S, 27.87. Found (percent): C, 51.65; H, 7.85; N, 11.98; S, 27.53.

From the aqueous solution are obtained 7 g. (12.8%) of dithiocarbamate [$C_4H_8NC(S)S^-\cdot {}^+H_2NC_4H_8$]; M.P. 156–158° C.

$C_9H_{18}N_2S_2$ (218.37). Calc'd (percent): C, 49.51; H, 8.31; N, 12.83; S, 29.35. Found (percent): C, 49.29; H, 8.30; N, 12.71; S, 29.23.

Also, there are obtained 20 g. of a gum.

EXAMPLE 5

9 g. (0.3 mole) of formaldehyde (aqueous solution), 25.5 g. (0.3 mole) of piperidine and 9.6 g. (0.3 mole) of sulfur are refluxed in 15 ml. of ethyl alcohol for 11 hours. The pH decreases from 9.6 to 8.9. After cooling two layers and a precipitate (2.3 g. of sulfur) are formed. The upper layer yields 5.4 g. of oil. The lower layer yields upon evaporation 26.6 g. of a liquid and upon distillation 6.9 g. (17.9%) of thioformamide [$C_5H_{10}NC(S)H$]; B.P. 87–89° C./0.07 mm., $n_D^{20}$ 1.5923. Adduct with methyl iodide, M.P. 121–122.5° C.

$C_6H_{11}NS$ (129.24). Calc'd percent: C, 55.76; H, 8.58; N, 10.84; S, 24.81. Found percent: C, 56.28; H, 8.54; N, 10.59; S, 24.56.

The salt remains in the condenser after distillation. It is dissolved with ethyl alcohol and recrystallized in ethyl alcohol. Yield 5 g. (13.5%) of dithiocarbamate

[$C_5H_{10}NC(S)S^-\cdot{}^+H_2NC_5H_{10}$]

M.P. 168–171° C.

$C_{11}H_{22}N_2S_2$ (246.43). Calc'd percent: C, 53.61; H, 9.00; N, 11.37; S, 26.02. Found percent: C, 53.36; H, 9.15; N, 11.07; S, 26.16.

In another run 15 g. (0.5 mole) of formaldehyde (40.5 g. of 37% aqueous solution), 42.6 g. (0.5 mole) of piperidine, 16 g. (0.5 mole) of sulfur and 25 ml. of ethyl alcohol are refluxed for 14 hours. Evolution of hydrogen sulfide is observed finally.

Upon concentration 11 g. (17.8%) of dithiocarbamate crystallize. From the filtrate 16 g. (24.8%) of thioformamide are obtained; B.P. 75–80° C./0.01 mm. A trace of the corresponding formamide is present according to the $^1$H-NMR spectrum.

In another run S, CH₂O and piperidine are refluxed in 100 ml. of ethyl alcohol using a ratio of 1.5:0.5:0.5. After 7 hours an oil is formed which dissolves on further heating. After 15 hours the excess of sulfur (20 g.) is filtered off and the filtrate concentrated by evaporation. The residue yields upon washing with ethyl alcohol 30 g. (48.7%) of dithiocarbamate. In this case no thioformamide was isolated.

EXAMPLE 6

15 g. (0.5 mole) of formaldehyde (37% aqueous solution), 15.5 g. (0.5 mole) of methylamine (40% aqueous solution), 48 g. (1.5 mole) of sulfur and 100 ml. of ethyl alcohol are refluxed. Evolution of hydrogen sulfide is observed after 2 hours. Excess sulfur is filtered off after 3 hours, the ethyl alcohol is evaporated and the residue extracted with ether. Upon distillation of the ether extract there are obtained 6.3 g. (16.1%) of thioformamide [$CH_3NHC(S)H$], B.P. 125–128° C./12 mm., $n_D^{20}$ 1.6088

The $^1$H-NMR spectrum shows the presence of this cis and trans form

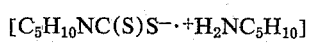

ratio trans:cis=6.54
a 188=3.13δ (J$_{HH}$ 1.04)
b 488=8.13δ
c 565=9.41δ (Jun 1.04)
a 200=3.33δ (0.52)
b 488=8.13δ
c 546=9.10δ (0.52)

EXAMPLE 7

15. g. (0.5 mole) of formaldehyde (37% aqueous solution), 22.5 g. of ethylamine (70% aqueous solution), 48 g. (1.5 mole) of sulfur, 100 ml. of ethyl alcohol and 25 ml. of water are refluxed for 3 hours. During this time some evolution of hydrogen sulfide is observed. The excess of sulfur is filtered off, the alcohol evaporated and the residue extracted with ether. Distillation of the ether extract yields 12 g. (27%) of thioformamide

[$C_2H_5NHC(S)H$]

B.P. 75–80° C./0.5 mm.

EXAMPLE 8

15 g. (0.5 mole) of formaldehyde (37% aqueous solution), 43.5 g. (0.5 mole) of morpholine, 48 g. (1.5 moles) of sulfur, 100 ml. of ethyl alcohol, 250 ml. of water and 6 ml. of pyridine (pH=8) are refluxed for 7 hours. 32 g. of sulfur are filtered off, the filtrate evaporated to dryness and the residue extracted with ether. Upon cooling of the ether extract at −20° C. there are crystallizing 42 g. (63%) of thioformamide

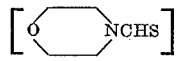

M.P. 69–71° C.

The residue which is insoluble in ether is recrystallized in methyl alcohol and yields 7 g. (11.2%) of dithiocarbamate

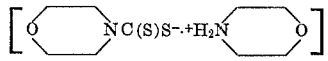

which sublimes on heating.

EXAMPLE 9

To 44.08 g. (0.5 mole) of N,N'-dimethyl-1,2-diaminoethane in 100 ml. of ethyl alcohol are added dropwise at 20° C. 30 g. (1 mole) of formaldehyde (37% aqueous solution) and subsequently 36 g. (3 moles) of sulfur. Then, the mixture is refluxed. Evolution of hydrogen sulfide is detected after 1 hour and the solution becomes dark. The excess of sulfur is filtered off and the filtrate concentrated. Upon cooling 17 g. of crystals separate; M.P. 108–110° C. This compound shows in the $^1$H-NMR spectrum peaks for CH₃ at 3.07δ (s., 3 H) and CH₂ at 3.52δ (s., 2 H), consequently, the backbone is still present. It is a compound having the structure

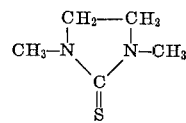

$C_5H_{10}N_2S$ (130.2). Calc'd percent: C, 46.11; H, 7.74; N, 21.51; S, 24.62. Found percent: C, 45.14; H, 7.65; N, 20.89; S, 24.17.

Upon fractional distillation of the filtrate there are obtained besides a forerun (4 g., B.P. 60–70° C./0.1 mm.), 8 g. of the compound mentioned above; B.P. 120–130° C./0.1 mm.; and 22 g. (25%) of thioformamide B.P. 145–150° C./0.1 mm., M.P. 73–74° C. (from $CH_3OH$)

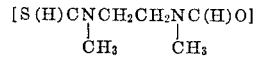

$C_6H_{12}N_2OS$ (160.24). Calc'd percent: C, 44.96; H, 7.54; N, 17.48; S, 20.00. Found percent: C, 45.77; H, 7.61; N, 16.83; S, 20.83.

The thioformamide shows in the $^1$H-NMR spectrum peaks for CHS at 9.22 and 9.18 δ (1 H, calc'd 1 H); CHO at 8.04 and 7.97 δ (1 H, calc'd 1 H); CH₂CH₂ at 3.65δ (m., 3.8 H, calc'd 4 H); and CH₃ at 3.28 and 3.26δ, and 2.94 and 2.89 (s., 6 H, calc'd 6 H).

The doubling of the peaks shows that isomers are present such as

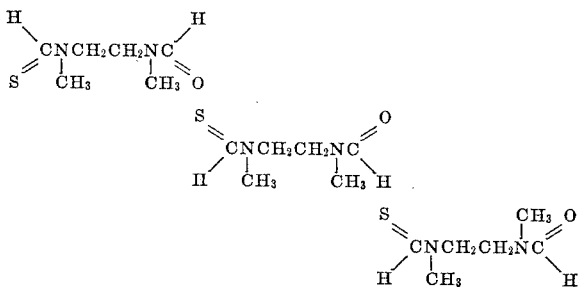

What I claim is:
1. A process for preparing organic thioformamides of the formula

$$R^1(R^2)NC(S)H$$

and organic dithiocarbamates of the formula $$R^1(R^2)NC(S)SH \cdot HN(R^1)R^2$$

in which $R^1$ and $R^2$ are identical or different alkyl groups having up to and including 8 carbon atoms, cycloalkyl groups having up to and including 8 carbon atoms, or taken together with their nitrogen atom a heterocyclic grouping selected from the group consisting of pyrrolidine, piperidine and morpholine and $R^2$ can also be a hydrogen atom which comprises reacting formaldehyde and an amine of the formula $R^1(R^2)NH$ in which $R^1$ and $R^2$ have the same significance as above, and which amine possesses a dissociation constant $pK_a \geq 8$, or a condensation product formed from formaldehyde and said amine of the formula $$R^1(R^2)NCH_2OH \text{ or } R^1N=CH_2$$

in which $R^1$ and $R^2$ have the same significance as above, with sulfur at an elevated temperature in an aqueous alcohol containing 1 to 4 carbon atoms.

2. A process according to claim 1 in which equimolar quantities of formaldehyde and amine are used.

3. A process according to claim 1 in which at least a fourfold stoichiometric quantity of sulfur is used.

4. A process according to claim 1 in which the alcohol is ethyl alcohol.

5. A process according to claim 1 in which the alcohol contains 10 to 40% per weight of water.

6. A process according to claim 1 in which the amine possesses a dissociation constant $pK_a \geq 10$.

7. A process according to claim 1 in which the reaction is carried out in the presence of a tertiary base.

8. A process according to claim 1 in which $R^1$ and $R^2$ are taken together with their nitrogen atom to form the pyrrolidino group.

9. A process according to claim 1 in which $R^1$ and $R^2$ are taken together with their nitrogen atom to form the piperidino group.

References Cited

UNITED STATES PATENTS 2,492,314  12/1949  Olin et al. _____ 260—567

HENRY R. JILES, Primary Examiner

S. D. WINTERS, Assistant Examiner

U.S. Cl. X.R.

260—326.883, 247.1, 309.7, 455 A, 551 R, 566 R, 584 R, 570.5 R, 244.7 R, 326.5 N, 247.7 A; 71—100